E. W. SMITH & E. G. STEINMETZ.
RETAINING ENVELOP OR COVER FOR STORAGE BATTERY ELECTRODES.
APPLICATION FILED JULY 1, 1911.
1,218,329. Patented Mar. 6, 1917.
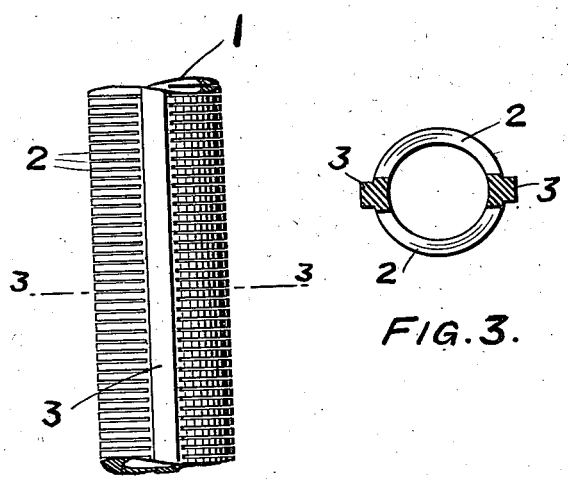
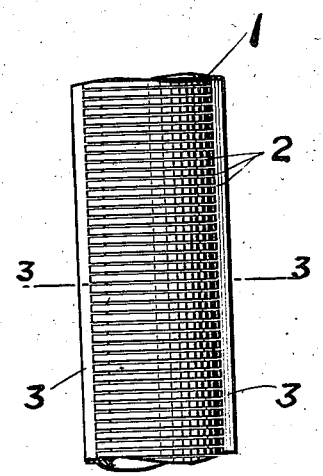
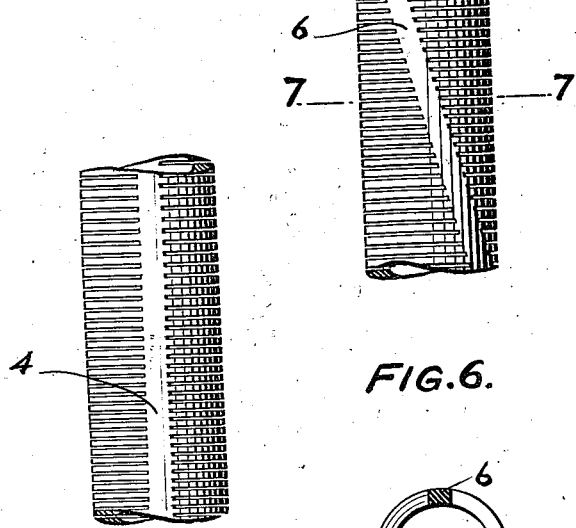
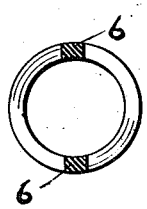
WITNESSES:
INVENTORS
Edward W. Smith
Edward G. Steinmetz
BY
ATTORNEY.

UNITED STATES PATENT OFFICE.

EDWARD W. SMITH AND EDWARD G. STEINMETZ, OF PHILADELPHIA, PENNSYLVANIA.

RETAINING ENVELOP OR COVER FOR STORAGE-BATTERY ELECTRODES.

1,218,329. Specification of Letters Patent. Patented Mar. 6, 1917.

Application filed July 1, 1911. Serial No. 636,469.

*To all whom it may concern:*

Be it known that we, EDWARD W. SMITH and EDWARD G. STEINMETZ, both citizens of the United States, residing at the city of Philadelphia, in the county of Philadelphia and State of Pennsylvania, have invented a certain new and useful Retaining Envelop or Cover for Storage-Battery Electrodes, of which the following is a specification.

The principal object of the present invention is to provide a unitary or one-piece tubular insulating envelop or cover having minute pores or crevices which shall have openings of fixed or predetermined size and of relatively large depth in comparison with their size, so that the integral wall in which they are formed shall, by reason of the flexibility and elasticity of the tube, follow without permanent distortion or injury the radial expansion and contraction, during charge and discharge of the active material with which the tube is filled, and shall resist or restrict disintegration of the active material by work and wash and resist its dislodgment from its original position.

Preferred embodiments of the invention are selected for illustration in the accompanying drawings in which—

Figure 1, is an elevational view of a tubular cover or envelop embodying features of the invention.

Fig. 2, is a similar view taken at right angles to the view of Fig. 1.

Fig. 3, is a sectional view taken on the lines 3—3 of Figs. 1 and 2.

Figs. 4, 5 and 6, are side views of covers or envelops illustrating modified embodiments of the invention, and Fig. 7, is a sectional view taken on the line 7—7 of Fig. 6.

In the drawings 1, is an insulating tube possessed of the requisite elasticity, strength and non-corrosive or acid resisting properties. Hard rubber is an example of suitable material from which to make the tube. The tube 1, has a generally cylindrical wall provided with sets of pores or crevices 2, preferably elongated and extending circumferentially between ribs 3. The width or size of the openings is small in comparison with the thickness of the wall, or in other words, with the depth of the opening. As shown in Figs. 1, 2 and 3, the ribs 3, project outwardly from the external surface of the tube and are adapted to serve as spacers for adjacent electrodes. As shown in the other figures the ribs 4, 5 and 6, do not project outwardly and while they extend generally axially of the tube they are differently arranged. For example, the ribs in Fig. 6, are spirally arranged and in Fig. 5, the ribs break joint so that there is a short rib first on one side and then on the other. The gist of the construction is that the pores or openings shall be small in comparison with the thickness of the wall and that the pores or openings shall be held open by the imperforate portions of the wall, and evidently this can be accomplished by the substitution of openings other than those of the preferred form. The tube may be open at one or both ends for the reception of the active material, or material to become active and for the accommodation of conducting terminal connections. By reason of the straight uncorrugated or cylindrical form of the wall the tube is generally circular in cross-section and is therefore of the form least subject to deformation. The material of which the wall is made is sufficiently elastic to cause the wall to hug the active material or material to become active. In use a tube of this shape does not lose or change its form but confines the active material or material to become active and opposes its tendency to swell or grow. The width of the elongated minute pores or crevices is exaggerated in the drawings. As a matter of description it may be said that for a tube whose wall is 1-32 of an inch thick an elongated opening of from 2-100 to 1-100 of an inch or less in width is appropriate and in any case the size of the opening is less than the thickness of the wall. The thicker the wall the greater may be the width of the pores or size of the openings. The ribs insure the maintenance of the proper and required width or size of opening of these pores or crevices and also hold the rings or sections of the tube together so that the tube remains a unit. The described cover as a whole in use possesses the advantages of a stack or pile of separate washers between which the electrolyte and current may easily pass and between which the sediment may not readily pass, but it is essentially better than a pile or stack of separate washers because it can be conveniently held and handled and because the width or size of the opening of the pores and crevices is fixed so that such opening may not be unduly contracted or widened as might occur by the application or removal of pressure axially of a stack or pile of separate washers.

What we claim is:

1. An insulator and retainer for storage battery electrodes which comprises an independent smooth unitary wall of insulating material provided with minute slots formed by the removal of material of the wall and the openings of which are of such width that current and electrolyte may and disintegrated fine astive material may not pass through and which openings are held open by the imperforate portion of the wall.

2. An insulator and retainer for storage battery electrodes which comprises an independent smooth unitary wall of insulating material provided with minute slots formed by the removal of material of the wall and the openings of which are of such width that current and electrolyte may and disintegrated fine active material may not pass through and which openings are held open by the imperforate portion of the wall, and axial ribs integral with the wall.

In testimony whereof we have hereunto signed our names.

EDWARD W. SMITH.
EDWARD G. STEINMETZ.

Witnesses:
W. E. GOSSLING,
H. S. HODSON.